United States Patent [19]

Oberländer et al.

[11] 4,317,379

[45] Mar. 2, 1982

[54] PROCESS AND APPARATUS FOR THE CONTINUOUS WITHDRAWAL OF SPECIMENS FROM A CURRENT OF A CRUDE GAS FOR PURPOSES OF GAS ANALYSIS

[75] Inventors: Gerhard Oberländer, Leipzig; Reinhard Müller, Hoyerswerda; Werner Funke, Markkleeberg, all of German Democratic Rep.

[73] Assignee: Veb Gaskombinat Schwarze Pumpe, Schwarze Pumpe, German Democratic Rep.

[21] Appl. No.: 123,794

[22] Filed: Feb. 22, 1980

[30] Foreign Application Priority Data

Jan. 8, 1979 [DD] German Democratic Rep. .... 210381

[51] Int. Cl.[3] .................... G01N 1/24

[52] U.S. Cl. .................... 73/863.12; 73/863.83

[58] Field of Search .................... 73/421.5 R, 421.5 A, 73/422 R, 863.12

[56] References Cited

U.S. PATENT DOCUMENTS 2,322,018 6/1943 Huber .................... 73/422 R
3,255,575 6/1966 Roberts .................... 73/422 R
3,985,624 10/1976 Prevost .................... 73/421.5 R
4,131,011 12/1978 Ling .................... 73/422 R
4,191,541 3/1980 Jenkins .................... 73/863.12

*Primary Examiner*—S. Clement Swisher
*Attorney, Agent, or Firm*—Michael J. Striker

[57] ABSTRACT

In a process for obtaining in a continuous operation a specimen gas from a flowing gas current of a pressurized crude gas for analysis purposes, a branch current is withdrawn from the main current in an anisokinetic manner whereupon the branch current of the crude gas is passed through a cooling device and a specimen is then withdrawn from the branch current likewise in an anisokinetic manner and the specimen is subjected to pressure release and filtering prior to passing it into a gas analysis apparatus.

The invention also comprises an apparatus for carrying out the above process comprising a passageway for the main crude gas, a branch for withdrawing in anisokinetic manner a partial current of crude gas from the main current, cooling means, duct means for passing said branch current through said cooling means, means for withdrawing a specimen from the branch current in an anisokinetic manner after passing through the cooling means and a pressure release valve and filter means provided in the duct for passing the specimen to a gas analysis device.

10 Claims, 1 Drawing Figure

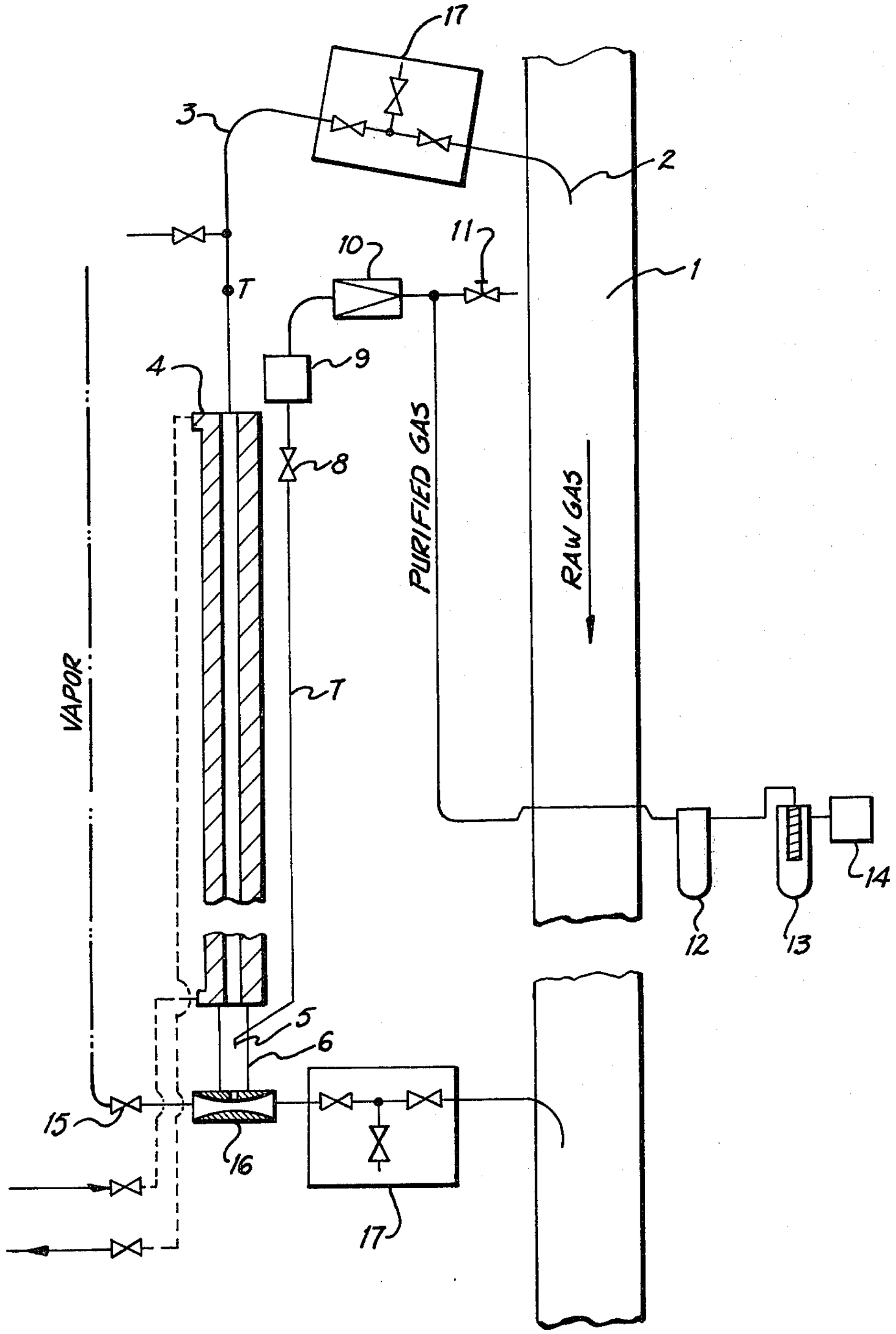
17
3
2
1
10
11
T
9
4
8
PURIFIED GAS
RAW GAS
VAPOR
7
12
13
14
5
6
15
16
17

PROCESS AND APPARATUS FOR THE CONTINUOUS WITHDRAWAL OF SPECIMENS FROM A CURRENT OF A CRUDE GAS FOR PURPOSES OF GAS ANALYSIS

BACKGROUND OF THE INVENTION

The invention relates to a process and an apparatus for continuously withdrawing a partial current from a current of crude gas for obtaining a specimen for the gas analysis in order to properly control and supervise the process.

In the art of gas generation, for instance during oxygen pressure gasification, hot steam saturated crude gases are obtained which are under a highly elevated pressure. These gases cannot be directly passed into a gas analysis device or an associated pressure reduction precision valve where they are necessary for the optimum control of the operation. Instead, it is necessary to subject them to a pretreatment prior to the gas analysis. This type of pretreatment is the object of the present invention.

The invention can also be used in the continuous withdrawing of specimens by means of a sound in case of natural gases which flow at a high temperature and at high pressure and are likewise steam saturated and contain solid components and hydrocarbons which are subject to condensation when the gas is cooled.

The process and apparatus of the invention can furthermore be used for devices where crude gas mixtures are passed through conduits, particularly in the chemical industry and where similar difficulties are encountered when a specimen is to be obtained for gas analysis.

It has already been known to withdraw crude gas from a gas current through a detour and then to subject the branch current to pressure release in a valve and to pass the branch current through further devices for regulating the gas pressure.

This prior art process does not enable a sufficient purging of the crude gas. It also involves risks regarding the safety of the apparatus and is not in accord with the rules in this respect since the tars and dusts from the crude gas may cause an uncontrollable pressure build up in the specimen withdrawal system. Even a subsequent purging of the gas specimen by means of ceramic filters or other filter materials does not lead to a sufficient degree of purity to assure a constant uninterrupted operation of the analysis apparatus.

Such uninterrupted operation of the analysis apparatus likewise could not be obtained by employing filters for the gas which was still under high pressure. Irrespective whether these filters consist of ceramic fibrous or porous organic materials they result after comparatively short operating times in clogging up and thus in a failure of the analysis apparatus. To eliminate the clogging up a cleaning or exchange of the filter is necessary which requires substantial amounts of time.

The use of electrofilters, particularly for separating liquid mists, for instance in case of tars and solid materials is impractical where the possibility of formation of explosive gas mixtures exists which can never be excluded in case of the oxygen pressure gasification of solid fuels.

The addition of safety devices such as flame safety valves and similar likewise results in an unacceptable increase of the expense of the apparatus.

In addition, this manner of avoiding the risk would not guarantee a perfect separation of the pollutants. The removal of the separated pollutants which may exist in several phases, such as liquid, paste-like or solid, results in further difficulties and expenses.

It has also been proposed to effect the separation of liquid and solid pollutants by means of said centrifugal separators.

This proposition has the disadvantage that under the conditions of operation emissions may appear at the inlet nozzles and at the walls of the cyclone. In view of the high pressure it is then necessary for safety reasons to carry out periodic measurements of the wall thickness at relatively short periods of time. Besides, the removal of the separate products again involves considerable difficulties. A process for the continuous withdrawal of specimens of a polluted gas at high temperatures, particularly a crude gas as obtained in a lignite pressure gasifier and an apparatus for carrying out this process has been described in the patent of the German Democratic Republic No. 94,909. In this process, however, clogging up and failure of the analysis apparatus occurs by the lack of a reheating of the separated product prior to removal by the specimen withdrawal system, furthermore by the use of horizontal conduits and finally by the absence of an anisokinetic withdrawal of the branch current. The Patent No. 110,345 of the German Democratic Republic also describes a process and apparatus for withdrawing a gas which is charged with dust and condensate and is under pressure, particularly a crude gas for purpose of the analysis. In this case a gas current is produced in the branch by means of a baffle or shutter provided in the main conduit.

This baffle or shutter constitutes, however, a serious risk regarding the withdrawal of the products from the main conduit in case of gases which contain large proportions of dust and tar.

Extended investigation has shown that a mere onetime withdrawal of the specimen current, countercurrent to the main current, results soon in a clogging up of the specimen withdrawal system and in an interference with the gas analysis system by pollutants, particularly in those cases where a forced circulation in the branch circuit is not provided.

In this area of technology it has also become known that it is possible to reintroduce parts of the branch current into the main current by means of a pump, for instance a steam jet or injector. If the pump is provided at the outer terminal of the specimen withdrawal system, the gas composition within the system will not be affected.

It has also become known that the products separated out in the crude gas current can be reintroduced continuously by means of such pump into the initial gasification system.

It is an object of the present invention to provide for a process and apparatus by which in case of a highly polluted crude gas and upon observance of all safety regulations, a cold gas specimen can be passed into the gas analysis apparatus in a continuous operation and practically without requiring any special service and at a minimum idling time. This specimen gas should then be free of pollutions and its basic composition should not be modified by the process of withdrawal from the main gas current.

ESSENCE OF THE INVENTION

This object is met by passing a flow of pressurized gas through a passageway in which a branch current is withdrawn from the main gas current whereupon the branch current is passed through a cooling device. Thereafter, the desired specimen is withdrawn from the branch current, its pressure is released, and it is passed into the gas analysis apparatus. The withdrawal of the branch current from the main gas current and the withdrawal of the specimen from the branch current are both effected in an anisokinetic manner. Filtering devices may be provided prior and subsequent to the pressure release valve. Any condensate formed in the cooling device may be reintroduced, preferably after reheating into the main gas current.

The entire process can be carried out in a continuous operation and is particularly applicable to crude gases which are heavily polluted by dust, tar and water vapor. In the process a purified and cold gas specimen is obtained for measuring purposes. The double withdrawal in anisokinetic manner and the passing through the cooling device accomplishes that all condensable products are present as liquids which, at the same time, permit the separation of solid materials and on the other hand prevent the solidification, particularly of all tar-like components. The process is particularly useful in gasifiers for obtaining a pressure gas from solid fuels, but may also be used in sounds for analyzing natural gases and in general chemical plants.

The anisokinetically withdrawn branch circuit of the crude gas is passed into a vertical cooling device via conduits which are preferably of ascending direction, but may also be descending. Following the cooling device there is provided a steam injector which passes the specimen gas on into the gas analysis device, but also passes the amount of the branch gas circuit which is not necessary for gas analysis and furthermore the separated solid and liquid pollutants into the main gas conduit in direction of the main gas current.

The withdrawal of the gas specimen from the branch circuit which, as indicated, is likewise anisokinetic is effected through a sound which is located in the axial center of the specimen conduit in the direction of flow. The conduit between the outlet from the cooling device and the inlet of the steam injector preferably is sufficiently long and the distance between the cooling device exit and the steam injector outlet is preferably sufficiently large to permit a reheating of this part of the conduit by a heating device.

The gas conduit leading to the analysis apparatus rises from the vertically directed branch gas conduit and cooling device and leads through a high pressure filter with automatic closure device and a filling of sponge glass, a pressure release valve, a condensate separator and a polyurethane filter and eventually ends in the measuring apparatus.

Directly after withdrawing the branch circuit from the main gas current there is provided a valve which has an inlet duct which is normally closed and which permits the addition of an added gas into the branch gas current and thus a control over the idling time in the gas analysis apparatus.

There are also provided in the branch gas circuit valves and discharge outlets permitting to rinse the entire system prior to commencement of the operation or for cleaning purposes with steam upon exclusion of the atmosphere. Because of the latter circumstance the entire pressure gradient of the rinsing steam is fully effective and a control of the rinsing operation is possible.

In contrast to the prior art the invention makes use of a double anisokinetic withdrawal of a branch gas current from the main conduit and crude gas circuit. In this manner it is possible to keep pollutions out of the specimen gas system even in case of crude gases which have high contents of solid or liquid pollutants.

The branch conduit is formed in a manner that immediately after withdrawal of gas from the main current pollutions will either flow back into the main current or will fall into the vertical cooling device. This arrangement prevents a certain lowering of the consistency of the separated materials at the inlet to the cooling device.

The place of the steam injector which provides the propelling agent and the provision of definite conduit cross sections and the distances between the outlet of the cooling device, the initial portion of the specimen gas conduit and the injector inlet permit another reheating of the dust-tar-water suspension which is separated in the cooling device. This will avoid a clogging of the apparatus parts between the cooling device and injector.

As a result there are obtained:

(a) A sufficient flow capacity of the material separated in the cooling device and the prevention of clogging up of this part of the device;

(b) Another limited reheating of the specimen gas which will assure the flow properties and a feedback of any small amounts of liquid or solid pollution suspensions which have been separated out and may have passed into the specimen gas conduit;

(c) A further prevention of repeated evaporation of the liquid pollutions which have been separated by condensation in the cooling device which is prevented because of the limited reheating step.

The passage of the specimen gas out of the branch gas circuit is arranged so that any tar oil mist which may be separated in the specimen gas system remains liquid because of the temperature and will flow back because of the angle in which the specimen gas duct branches off the vertical conduit of the branch gas circuit. The possibility to add a control gas at the beginning of the specimen withdrawal permits the control of the operation of the device and the necessary restriction of the idling time.

Thus, the process and apparatus of the invention are distinguished from devices of the prior art by their simple and clear arrangement, by eliminating contact of the service personnel with condensates and gases, and by avoiding rinsing gases in the analysis system and avoiding the necessity for reintroducing gases at low pressure into the high pressure system and finally by a more favorable idling time.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single drawing FIGURE shows in diagrammatic form an apparatus for carrying out the invention.

DESCRIPTION OF THE PREFERRED EMBODIMENTS

In a main conduit 1 a crude gas is carried which has the following parameters:

| | |
|---|---|
| Gas pressure | 2.5 MPa |
| Gas temperature | 450 to 475° K. |
| Water vapor contents | saturated under the conditions of this example |
| Solid contents | 100 to 300 g/m$^3$ |
| Oil-tar contents | 100 g/m$^3$. |

By means of a sound 2 which is disposed in the axial center of the main conduit 1 in the direction of flow a branch current can be withdrawn in anisokinetic manner and is passed through an ascending conduit 3 into a vertically disposed cooling device 4. The temperature of the gas at the outlet of the cooling device is about 300° to 320° K. Matters having a boiling point below this temperature will therefore be subject to condensation.

The specimen gas which now is free of condensate is again withdrawn with a sound 5 in anisokinetic manner, the sound being disposed in the axial center of the outlet duct 6 from the cooling device. The specimen gas is then passed through an ascending duct 7 to a high pressure filter 9. By means of a valve 8 disposed ahead of this filter a separation is possible between high pressure portion and low pressure portion of the current. The valve 8 is not opened until the necessary operating conditions regarding pressure and temperature are fulfilled.

The specimen gas is then passed to a pressure release device 10. A safety valve 11 has the purpose to assure that the secondary pressure resulting from the pressure release will be about 0.14 MPa.

For the sake of the safety of the operation there are provided a condensate separator 12 and a filter 13 before the specimen gas is passed into the analysis apparatus 14. The specimen gas at this point has the following parameters:

| | |
|---|---|
| Gas pressure | 3 KPa |
| Gas temperature | 300 to 320° K. (temperature of the environment) |
| Water vapor contents | below saturation corresponding to the pressure release |
| Contents of solids and oily-tar residues: | no detectable traces in the control filter disposed ahead of the analysis apparatus (13) |

At a charge of 200 l/h of specimen gas an idling time of 3 to 4 minutes will occur including the analysis apparatus. The temperature provided after the cooling of the branch current of crude gas provides that all condensable products are present at that point as liquids which latter also perform the function of removing any solids that may be present. A solidification of tar-like products does not occur.

The condensate which is collected below the conduit 6 is again evaporated by steam introduced through the duct 15 and is reintroduced by means of the injector 16 into the main conduit 1 together with any crude gas from the branch current 3 which may not be required for the gas analysis.

In the ascending branch gas current 3 and in the crude gas feedback shut-off valves and discharge ducts 17 are provided which have the function of separators, operation and cleansing auxiliaries.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process for obtaining, in a continuous operation, a specimen gas from a current of a pressurized crude gas to permit subjecting the specimen to a gas analysis in order to control the main gas current, said process comprising passing the main crude gas through a passageway, withdrawing a branch crude gas current from the main gas in said passageway and passing the branch current through a cooling device, thereby forming condensate, separating said condensate, withdrawing the desired specimen from the branch current, the withdrawal of the branch current of the crude gas from the main current of crude gas and the withdrawal of the specimen from the branch current being effected in an anisokinetic manner, releasing the pressure of the specimen gas after withdrawal from the branch current, heating said condensate, reinroducing said condensate into said main gas current, said heating to keep solid and liquid gas contaminants fluid to prevent obstructing said reintroducing, and passing the specimen to said gas analysis apparatus.

2. The process of claim 1 wherein the withdrawn specimen gas is subjected to filtering prior and subsequent to said pressure release.

3. The process of claim 1 wherein the condensate formed in said cooling device is separated before excess specimen gas is reintroduced into the main gas current.

4. The process of claim 1 wherein the withdrawal of the branch current of crude gas is effected in the axial center of the said passageway in the direction of flow of the main crude gas current.

5. The process of claim 1 wherein the withdrawal of the specimen from the branch current of crude gas is effected in or in alignment with the axial center of the cooling device.

6. An apparatus for obtaining, in a continuous operation, a specimen gas from a gas flow of a pressurized crude gas in order to subject the specimen to a gas analysis for the purpose of controlling the main gas current, comprising
- a main conduit for a pressurized main gas flow,
- a branch duct disposed in said conduit for withdrawing in anisokinetic manner and in the direction of flow a portion of the crude gas,
- cooling means,
- duct means for bringing said branch current in contact with said cooling means,
- means for withdrawing said specimen gas from said branch conduit in an anisokinetic manner,
- a pressure release valve and duct means for passing said specimen gas through said pressure release valve and into a gas analysis device,
- and filter means prior and after said pressure release means.

7. The apparatus of claim 6 which includes means for reintroducing the condensate formed in said cooling means and any unused portion of the branch current into said main passageway.

8. The apparatus of claim 7 which includes a heating device for reheating the condensate and vaporizing it prior to reintroduction into said main conduit.

9. A process for obtaining, in a continuous operation, a specimen gas from a current of a pressurized crude gas to permit subjecting the specimen to a gas analysis in order to control the main gas current, said process comprising passing the main crude gas through a passageway, withdrawing a branch crude gas current from the main gas in said passageway and passing the branch current through a cooling device, thereby forming condensate, withdrawing the desired specimen from the branch current, the withdrawal of the branch current of crude gas from the main current of crude gas and the withdrawal of the specimen from the branch current being effected in an anisokinetic manner, releasing the pressure of the specimen gas after withdrawal from the branch current, evaporating said condensate, thereby producing formed gas, reintroducing said formed gas into said main gas current, and passing the specimen to said gas analysis apparatus.

10. The process of claim 9 wherein prior to said reintroducing the formed gas is subjected to a reheating.

* * * * *